United States Patent [19]

Wright et al.

[11] Patent Number: 4,571,845
[45] Date of Patent: Feb. 25, 1986

[54] POLYCAST LEVEL INSTRUMENTS WITH MEANS FOR RETAINING LEVEL VIALS THEREIN

[76] Inventors: Randall J. Wright, 3535 Studio Ct., Brookfield, Wis. 53005; Donald Wright, 14265 Juneau Blvd., Elm Grove, Wis. 53202

[21] Appl. No.: 574,877

[22] Filed: Jan. 30, 1984

[51] Int. Cl.⁴ .............................................. G01C 9/28
[52] U.S. Cl. ......................................... 33/379; 33/384
[58] Field of Search ................ 33/379, 377, 380, 381, 33/384, 376, 451, 365

[56] References Cited

U.S. PATENT DOCUMENTS 2,993,281  7/1961  Dock ...................................... 33/384
3,225,451  12/1965  Olexson et al. ....................... 33/384
3,368,287  2/1968  Ault ....................................... 33/279
3,824,700  7/1974  Rutty ..................................... 33/379

Primary Examiner—Willis Little
Attorney, Agent, or Firm—McDougall, Hersh & Scott

[57] ABSTRACT

A specially contoured cavity or recess for the precise alignment and retention of a uniform cylindrical level vial in Polycast plastic level instruments or other hand tools. The recess is accurately oriented with respect to tool measuring surfaces during the Polycast molding process. The contoured cavity or recess is dimensioned to tightly receive the level vials thereby accurately indexing the vial in relation to the measuring surfaces. The retention recess has a semi-cylindrical contour and a vial receiving opening defined between a pair of opposed ridges. The ridges include a sloped vial receiving forward surface and extend inwardly into the receiving opening a selected dimension to permit entry and retention of the level vial.

21 Claims, 5 Drawing Figures

U.S. Patent  Feb. 25, 1986  4,571,845
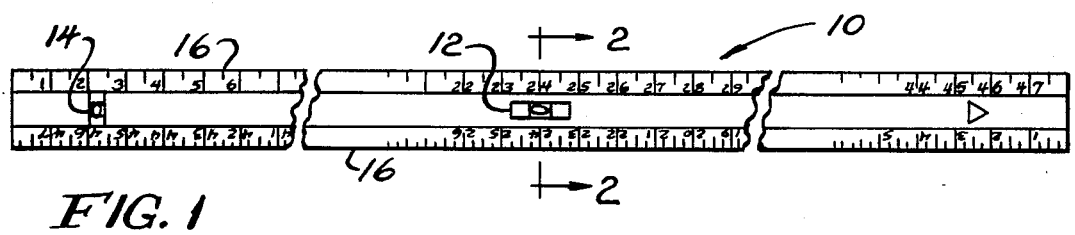
FIG. 1
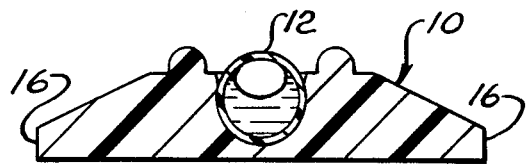
FIG. 2
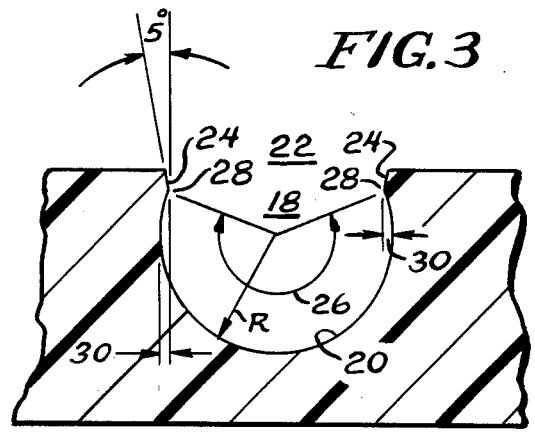
FIG. 3
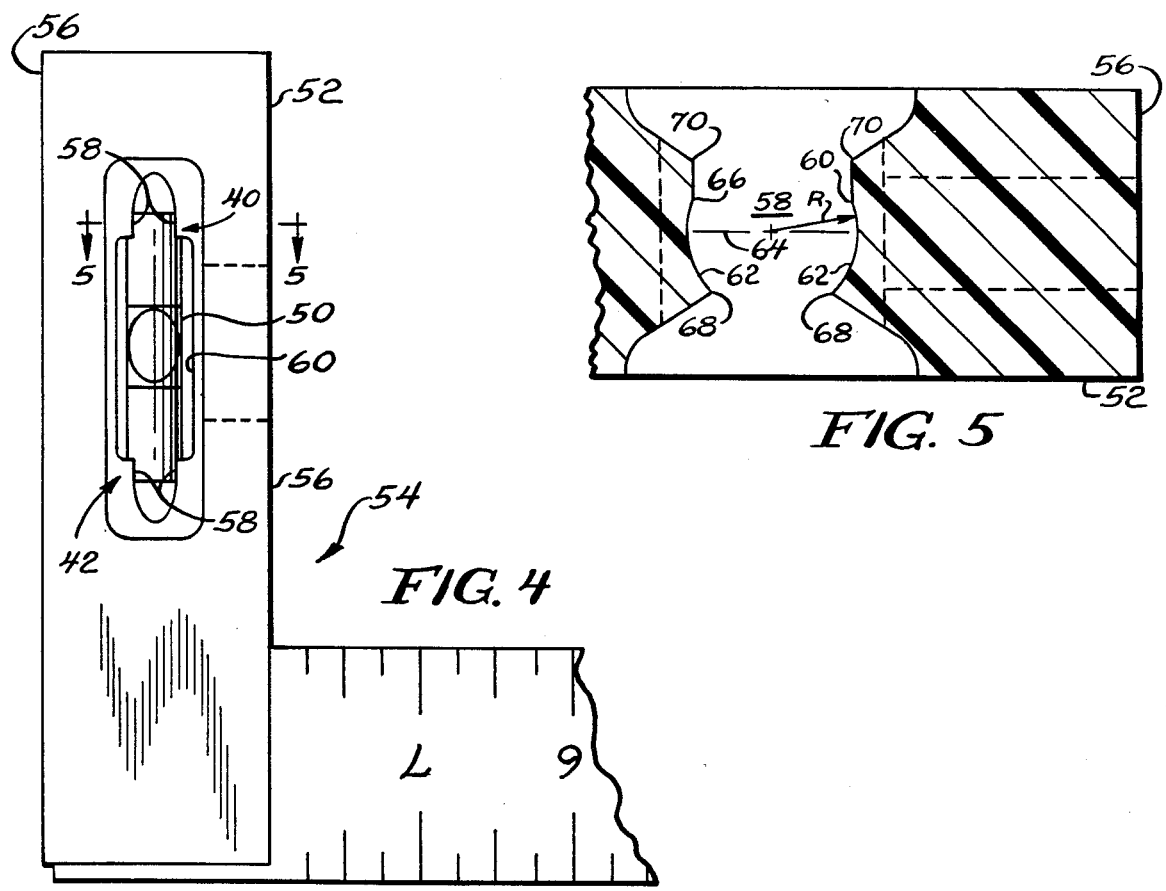
FIG. 4
FIG. 5

POLYCAST LEVEL INSTRUMENTS WITH MEANS FOR RETAINING LEVEL VIALS THEREIN

The present invention relates to Polycast* level instruments and other hand tools having level measuring vials therein and, more particularly, to an arrangement for accurately positioning and retaining the level vials within the Polycast material of the hand tool.

*Polycast is a trademark of the Empire Level Mfg Co.

As is well known, proper operation of a level instrument requires the accurate alignment of each level sensing vial in relation to the measuring surfaces of the instrument and, further, that the vials be retained against accidental removal or loss. A variety of arrangements have been developed which generally require time consuming and expensive postinsertion alignment of the level vial. One such early approach is exemplified by the Ziemann U.S. Pat. No. 2,810,206, wherein adjustable cover plates are provided which serve to retain the level vials following alignment thereof. The vials and cover plates are loosely assembled on the level frame, then aligned and secured by tightening fastening screws therethrough.

The subsequent introduction of metal frame level instruments combined with the development of the barrel-shaped bore, axially-symmetric level vial resulted in the revolutionary advance in level instrument construction in which level vials could be assembled into the level instrument in accurate relationship to the measuring surfaces without subsequent post-assembly alignment. Such a construction is shown in the Wright U.S. Pat. No. 3,311,990. In view of the substantial savings in labor expense, both during initial instrument assembly and, later, should vial replacement become necessary, virtually all modern level instruments now utilize adjustmentless constructions.

More recently, level instruments and other hand tools have been developed using an injection molded plastic process such as utilized to fabricate the Empire line of Polycast levels and hand tools. Such instruments offer an inexpensive but high quality alternative to metal frame construction. However, in order the achieve the full benefit from this new low cost technology for the fabrication of level instruments, it is necessary to avoid postassembly vial alignment operations and, further, to provide a vial mounting arrangement not requiring vial cover plates or other members adapted to retain the vial in proper position. The present invention achieves these goals.

It will be appreciated that the conventional technique for accurately orienting level vials in metal frame level instruments, wherein vial alignment notches are punched in the frame, is inappropriate and cannot be adapted for use with Polycast plastic tool constructions. It is not feasible to punch vial alignment notches in hand tools fabricated of plastic material. Although notches may be preformed within a cast plastic frame, this arrangement requires the use of cover plates to retain the vials in proper orientation within the notches. In addition, the secure coverless retention of level vials in a plastic instrument presents difficulties associated with bending of the relatively flexible Polycast plastic material which, in turn, can force the vials to become dislodged from the instrument. The present invention relates to a uniquely dimensioned vial alignment and retention cavity formed as part of the Polycast of other injection molding process and adapted to receive the vials in a snap-fit and to retain the vials in accurate and secure alignment on the level instrument or other leveling hand tool even during rough handling or flexing of the Polycast tool.

It is therefore an object of the present invention to provide inexpensive plastic level instruments and other hand tools having level vials therein in which the vials are accurately positioned within the instrument without post-assembly alignment. It is a further object that such level instruments shall include vial alignment and retention recesses formed in the Polycast plastic material during injection fabrication. The recesses shall be precisely aligned with reference to instrument measuring surfaces and it is a further object that the vials shall be received and rigidly retained in the recesses in snap-fit fashion without the use of side covers or other retention members. The vials shall not become dislodged during normal instrument use.

FIG. 1 is a horizontal plan view of a Polycast plastic rule containing a pair of level vials aligned and retained therein according to the present invention;

FIG. 2 is a sectional view of the rule taken substantially along line 2—2 of FIG. 1 illustrating a level vial in the contoured cavity of the present invention;

FIG. 3 is an enlarged fragmentary sectional view taken substantially along line 2—2 of FIG. 1 with the level vial removed to reveal in greater detail the contoured cavity of the present invention;

FIG. 4 is a horizontal plan view of a Polycast plastic try-square showing a second embodiment of the present invention; and, FIG. 5 is a section view of the try-square taken substantially along line 5—5 of FIG. 4 illustrating the specially contoured vial retention recesses of the present invention.

DESCRIPTION OF THE PREFERRED EMBODIMENT

FIG. 1 illustrates a typical Polycast injection molded plastic hand tool 10 containing the level vial alignment and retention recesses of the present invention. More specifically the tool depicted is a 48 inch rule having a pair of vials 12 and 14 precisely positioned with respect to measuring surfaces 16 of the rule for horizontal and vertical level measurement, respectively. An instrument of this type has been found to be an extremely valuable aid for the installation of wall mounted book shelves or other similar construction activities in which simultaneous distance measurement and leveling are required. It will be understood that the rule of FIG. 1 is merely exemplary of applications of the present invention and that other Polycast tools including, for example, try-squares or level instruments are contemplated. The rule of FIG. 1 was illustrated, however, as its extreme length and relatively thin cross-section results in significant flexure of the tool thereby placing significant stress on the vials in the retention recesses of the present invention. Notwithstanding, these vials remain securely retained and aligned.

The vial alignment and retention recesses of the present invention are best illustrated in FIGS. 2 and 3. FIG. 2 is a cross-section taken perpendicular to the vial axis depicting a vial properly positioned and retained within recess 18. Vials 12 and 14 are of the axially-symmetryc type having a uniform cylindrical cross-section of predetermined diameter along the longitudinal axis. Cylindrical vials of ⅜ or 7/16 inch diameter are commonly used. Recess 18 is dimensioned somewhat longer than the maximum length of the vial to be received therein and is generally defined by a uniform cross-section therealong. However, as described more fully below, the specially contoured vial alignment and retention surfaces may be limited to the opposed end regions of recess 18.

FIG. 3 is an enlarged partial cross-section of the same recess 18 with the vial removed for clarity. Recess 18 is defined by a cylindrical cavity segment 20 opening into a vial receiving and viewing window 22 defined between opposed bevelled surfaces 24. The cylindrical segment 20 comprising the cavity has a radius R substantially equal to that of the level vial to be received therein and, further, defines a cylindrical arc 26 in excess of 180 degrees. An arc of approximately 200 degrees is preferred to permit vial insertion while assuring secure vial retention. A slight relief or slope of about 5 degrees is provided on surfaces 24 to aid in the insertion of the level vial into cavity 20.

More particularly, the arc 26 of the cylindrical cavity 20 must be extended beyond the 180 degree semi-cylinder so that the ridges 28 defined by the respective limits of the cavity overlap the vial thereby grasping and retaining the vial therein. On the other hand, the maximum extent or overlap of the ridges 28 must be limited to permit removal of the molding corepiece during fabrication and subsequent insertion of the level vial during level assembly. The upper angular limit of arc 26 is determined by the vial diameter and plastic material used; although 270 degrees represents a practical maximum. In the preferred arrangement for the retention of ⅜ inch level vials, the 200 degree cavity arc corresponds to a draft 30 on each side of vial 12 of approximately 0.003 inches for a total overlap of about 6 thousandths of an inch. This has been found sufficient to quarantee vial retention even in the highly flexible 48 inch Polycast rule of FIG. 1.

Accurate alignment of the vial with respect to the measuring surfaces of the instrument is achieved by dimensioning the cylindrical cavity 20 for a substantially zero clearance fit with the level vial and by properly indexing core-piece during fabrication. In this manner, once positioned in recess 18, the vial is accurately retained in predetermined angular relationship to the instrument measuring surfaces.

Assembly of the level instrument may be quickly performed by nonskilled workers simply by placing a level vial in the receiving window 22 and by urging the vial downwardly into the recess. The Polycast or other plastic material defining ridges 28 are momentarily, but elastically, deformed as the vial is snapped into the cylindrical cavity. The vial is securely retained without need for additional securing means such a side covers or the like although the vial may be subsequently removed if necessary for replacement. Thus installed, the level instrument may be used for accurate level measuring without recourse to further time-consuming postassembly alignment procedures.

FIGS. 4 and 5 illustrate a second embodiment of the present invention. This embodiment differs from the previously considered arrangement principally in that the specially contoured vial alignment and retention surface is limited to the opposed end regions 40,42 of vial recess 18 and, further, that the associated cylindrical surface is now defined by two cylindrical segments of lesser arc positioned on substantially opposite sides of vial body. It will be appreciated that either or both of these modifications may be combined in any given level instrument according to the design objects thereof. In the present embodiment, the combination of the above two alterations permits vial viewing from two sides as well as top and/or bottom viewing. This is advantageous for certain hand tools, for example, a try-square.

Referring to FIG. 4, a level vial 50 is shown secured in the Polycast handle portion 52 of a try-square 54. The level is positioned and retained in precise parallel relationship to the measuring surfaces 56 by recesses 58 located at opposed ends of opening 60 in handle 52. Each recess 58 is comprised of a pair of cylindrical segments 62 defined on a common cylindrical surface of radius R. As before, this radius is substantially equal to the radius of the level vial to be positioned therein and, commonly, is ⅜ inch.

The arc of each cylindrical segment 62 is extended from centerline 64 approximately 10 degrees in one direction to define a first pair of opposed retention ridges 66 and approximately 45 degrees in the other direction to define a second pair of opposed retention ridges 68. As discussed above, the 10 degree extension of the cylindrical surfaces past the vial centerline results in 0.003 inch high ridges 66 sufficient to permit passage of the vial during assembly and to retain the vial once installed. On the other hand, since the second pair of ridges 68 do not afford passage of the level vial during instrument assembly, they are generally of greater height, and may be extended to define a continuous surface similar to that illustrated in FIGS. 2 and 3. The overall arc length of each segment 62 is preferably in excess of 30 degrees. A pair of slightly tapered surfaces 70 are defined outwardly of ridges 66 to guide the level vial into recesses 58 during assembly.

It will be appreciated that the surface of the retention and alignment recess need not be precisely dimensioned to tightly receive the level vial nor need it be of cylindrical cross-section. Alternatively, non-conforming cross-sections of larger diameter or irregular shape may be utilized in combination with a plurality of projections extending into the recess thereby to engage the level vial. For example, ridges 28, rather than defining opposed termini of the cylindrical surface 20 as shown in FIG. 3, alternatively represent projections or longitudinal ridges extending inwardly from a rectangular recess cavity. In such a construction, the level vial is retained by these ridges and by abutting contact with the bottom surface of the recess cavity. Referring to FIG. 5, ridges 66 and 68 may represent pairs of opposed inwardly directed projections or ridges along an otherwise flattened or enlarged wall portions 62.

We claim:

1. In a plastic level instrument or other hand tool having a plastic body portion with a cylindrical level measuring vial therein and a measuring surface, the improvement comprising means integrally formed with said body portion for aligning and retaining the level vial of predetermined radius and length within said body portion in predetermined angular relationship to said measuring surface, said means including a recess defined by a semi-cylindrical surface formed in said body portions, the longitudinal axis of the recess being oriented in precise angular relationship to the measuring surface, the length of the recess along its longitudinal axis being equal to or greater than the length of the level vial, the surface of said recess having a radius substantially equal to the radius of the vial and having an arc greater than 180 degrees and less than 360 degrees, a pair of opposed longitudinal ridges defined by the edges of the cylindrical surface, a vial receiving and viewing opening defined between the opposed ridges wherein the vial may be inserted into the recess through the opening and securely retained by the recess and ridges in precise orientation to the measuring surface without additional retention means.

2. In the plastic level instrument of claim 1, the arc of the semi-cylindrical recess surface is between 190 and 220 degrees.

3. In the plastic level instrument of claim 1, the arc of the semi-cylindrical recess surface being approximately 200 degrees.

4. In the plastic level instrument of claim 1 wherein the ridges define opposed tapered surfaces outward of the ridges adapted to guide and enhance vial insertion during assembly.

5. In the plastic level instrument of claim 4, the opposed tapered surfaces defining an angle of approximately 10 degrees therebetween, diverging in the outward direction.

6. In a plastic level instrument or other hand tool having a plastic body portion with a cylindrical level measuring vial therein and a measuring surface, the improvement comprising means integrally formed with said body portion for aligning and retaining the level vial of predetermined radius and length within in predetermined angular relationship to said measuring surface, said means including a recess defined by a semi-cylindrical surface formed in said body portions, the longitudinal axis of the recess being oriented in precise angular relationship to the measuring surface, the length of the recess along its longitudinal axis being equal to or greater than the length of the level vial, the surface of said recess having a radius substantially equal to the radius of the vial and having an arc greater than 180 degrees and less than 360 degrees, a pair of opposed longitudinal ridges defined by the edges of the cylindrical surface, a vial receiving and viewing opening defined between the opposed ridges wherein the vial may be inserted into the recess through the opening and securely retained by the recess and ridges in precise orientation to the measuring surface without additional retention means, the recess surface having a second vial viewing opening therein substantially opposite the vial receiving and viewing opening.

7. In the plastic level instrument of claim 6, the second opening in the recess surface defining an arc between about 30 and 170 degrees.

8. In a plastic level instrument or other hand tool having a plastic body portion with a cylindrical level measuring vial therein and a measuring surface, the improvement comprising means integrally formed with said body portion for aligning and retaining the level vial of predetermined radius and length within said body portion in predetermined angular relationship to said measuring surface, said means including a recess formed in said body portions adapted to receive the level vial, the recess having a longitudinal axis oriented in precise angular relationship to the measuring surface, the length of the recess along its longitudinal axis being equal to or greater than the length of the level vial, the recess including a pair of vial alignment and retention surfaces substantially at opposed ends thereof, each retention surface defined by a semi-cylindrical arc having a radius substantially equal to the radius of the vial and an arc length greater than 180 degrees and less than 270 degrees, a pair of opposed longitudinal ridges defined by the edges of each cylindrical surface, a vial receiving opening defined between the opposed ridges wherein the vial may be inserted into the recess through the openings and securely retained by the surfaces and ridges in precise orientation to the measuring surface without additional retention means.

9. In the plastic level instrument of claim 8, the arc of the semi-cylindrical surfaces is between 190 and 220 degrees.

10. In the plastic level instrument of claim 8, the arc of the semi-cylindrical surfaces being approximately 200 degrees.

11. In the plastic level instrument of claim 8 wherein the ridges define opposed tapered surfaces outward of the ridges adapted to guide and enhance vial insertion during assembly.

12. In the plastic level instrument of claim 11, the opposed tapered surfaces defining an angle of approximately 10 degrees therebetween, diverging in the outward direction.

13. In a plastic level instrument or other hand tool having a plastic body portion with a cylindrical level measuring vial therein and a measuring surface, the improvement comprising means integrally formed with said body portion for aligning and retaining the level vial of predetermined radius and length within said body portion in predetermined angular relationship to said measuring surface, said means including a recess formed in said body portions adapted to receive the level vial, the recess having a longitudinal axis oriented in precise angular relationship to the measuring surface, the length of the recess along its longitudinal axis being equal to or greater than the length of the level vial, the recess including vial alignment and retention means formed substantially in opposed ends thereof, each retention means defined by a pair of opposed semi-cylindrical surfaces on a common cylindrical form having a radius substantially equal to the radius of the vial, each surface having an arc length greater than 20 degrees, a pair of opposed longitudinal ridges defined by adjacent opposed edges of the surfaces, a vial receiving opening defined between the opposed ridges wherein the vial may be inserted into the recess through the openings and securely retained by the surfaces and ridges in precise orientation to the measuring surface without additional retention means.

14. In a plastic level instrument of claim 13, wherein the openings between the opposed ridges define arcs of the cylindrical form greater than 90 degrees and less than 180 degrees.

15. In a plastic level instrument of claim 13, wherein the openings between the opposed ridges define arcs of the cylindrical form of approximately 160 degrees.

16. In the plastic level instrument of claim 13 wherein the ridges define opposed tapered surfaces outward of the ridges adapted to guide and enhance vial insertion during assembly.

17. In the plastic level instrument of claim 16, the opposed tapered surfaces defining an angle of approximately 10 degrees therebetween, diverging in the outward direction.

18. In the plastic level instrument of claim 13, the arc length of each opposed surface of the retention means being approximately 55 degrees.

19. In a plastic level instrument or other hand tool having a plastic body portion with a cylindrical level measuring vial therein and a measuring surface, the improvement comprising means integrally formed with said body portion for aligning and retaining a level vial of predetermined radius and length within said body portion in predetermined angular relationship to said measuring surface, said means including a recess formed in said body portions adapted to receive a level vial, the recess having a longitudinal axis oriented in precise angular relationship to the measuring surface, the length of the recess along its longitudinal axis being equal to or greater than the length of a level vial; vial alignment and retention means integral with the plastic member and extending into the recess, said alignment and retention means adapted to engage the surface of a vial of the predetermined radius thereby securing the vial within the recess.

20. The plastic level instrument of claim 19 wherein the vial alignment and retention means includes a plurality of ridge means in parallel relationship to the recess axis.

21. The plastic level instrument of claim 19 wherein the vial alignment and retention means includes a plurality of projection means, the projection means spaced within the recess to contact a level vial of the predetermined radius.

* * * * *